United States Patent [19]

Gotou et al.

[11] Patent Number: 5,313,307
[45] Date of Patent: May 17, 1994

[54] CASING FOR PROJECTION TELEVISION RECEIVER AND SCREEN MOUNTING METHOD

[75] Inventors: Katumi Gotou, Takatsuki; Satoshi Aoki, Kadoma; Tsuyoshi Shimatani, Kyoto, all of Japan

[73] Assignee: Matsushita Electric Industrial Co., Ltd., Osaka, Japan

[21] Appl. No.: 905,885

[22] Filed: Jun. 29, 1992

[30] Foreign Application Priority Data

Jun. 28, 1991 [JP] Japan ................... 3-158538

[51] Int. Cl.$^5$ ................... H04N 5/64; H04N 5/65
[52] U.S. Cl. ................... 348/789; 348/786
[58] Field of Search ............. 248/917, 919; 359/609; 358/247, 248, 249, 252, 253, 254; 312/265

[56] References Cited

U.S. PATENT DOCUMENTS

| 4,136,935 | 1/1979 | Cook et al. ................... 352/104 |
| 5,155,627 | 10/1992 | Keehn et al. ................... 359/609 |

FOREIGN PATENT DOCUMENTS

| 0464663 | 6/1991 | European Pat. Off. ....... H04N 5/74 |
| 1177748 | 9/1964 | Fed. Rep. of Germany ...... 358/247 |
| 3247670 | 12/1982 | Fed. Rep. of Germany ......... H04N 5/72 |
| 792478 | 3/1958 | United Kingdom ............... 358/247 |

Primary Examiner—Edward L. Coles, Sr.
Assistant Examiner—Jerome Grant, II
Attorney, Agent, or Firm—Ratner & Prestia

[57] ABSTRACT

A method for installing a screen to a projection television receiver that uses a transmission-type screen such that the screen can be easily installed to and removed from the projection television receiver when multiple projection television receivers are combined to form a single large-scale multiple display system in which the receivers are stacked vertically and horizontally in an M×N rectangular configuration. Screen holding brackets installed in the cabinet body and screen clamping frames are used to secure the screen in place by inserting the screen clamping frames into the slight gap formed between the cabinet body and the screen holding brackets. Even when the screen clamping frames are inserted to the gap and slid to secure the screen, all movement of the clamping frames occurs within the dimensions of the cabinet body, thus making it easy to remove and install the screen even when multiple projection television receivers are combined in a single large-scale display system.

8 Claims, 16 Drawing Sheets

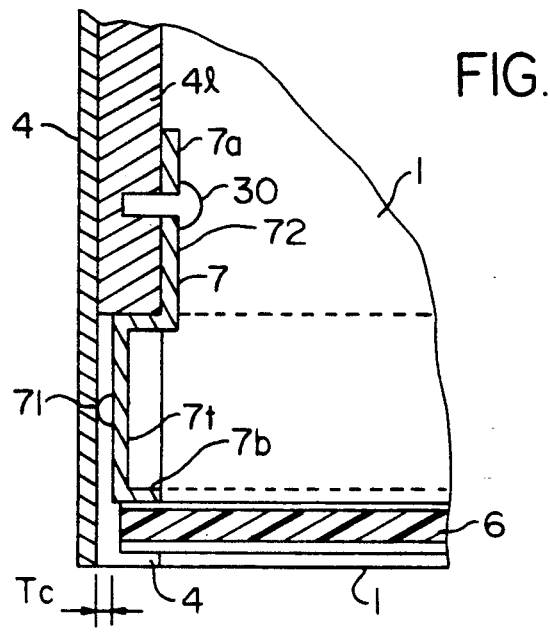
FIG. 3
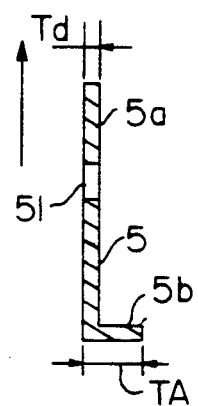
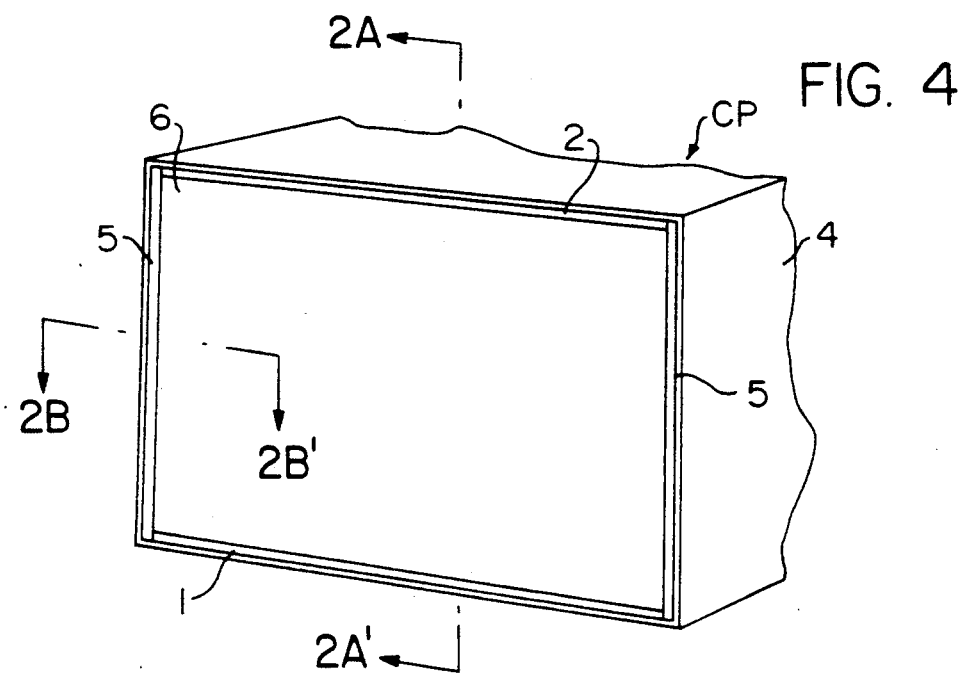
FIG. 4

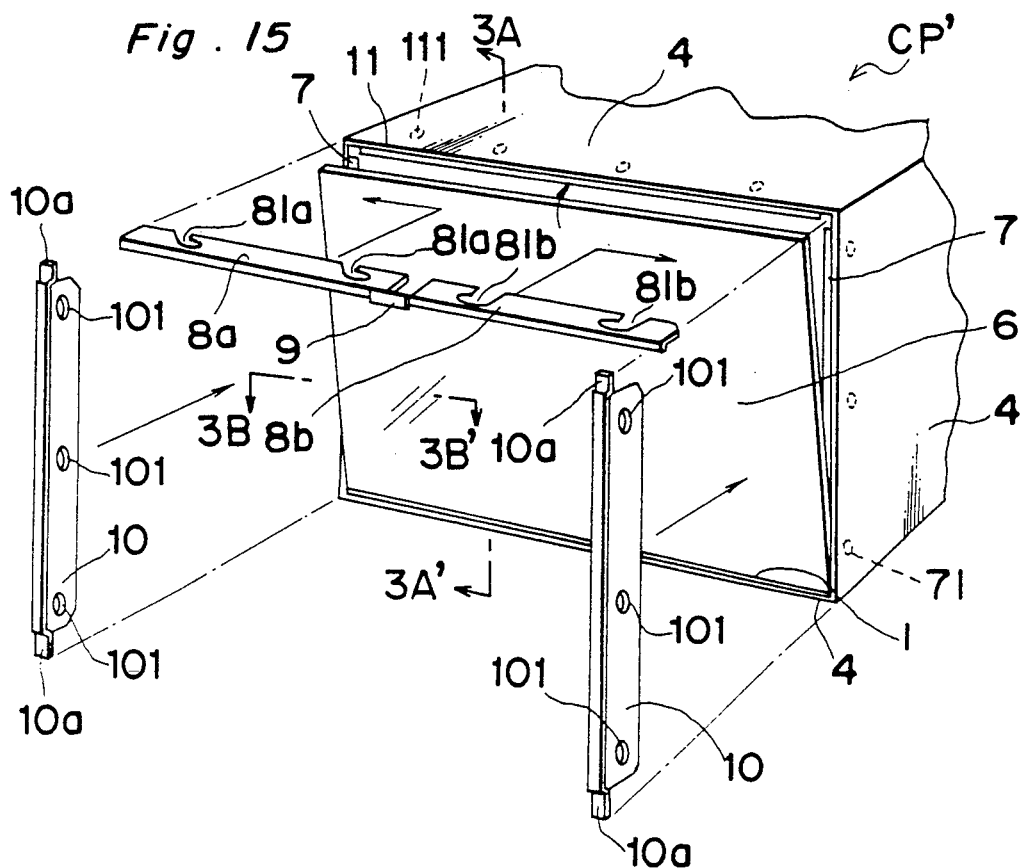
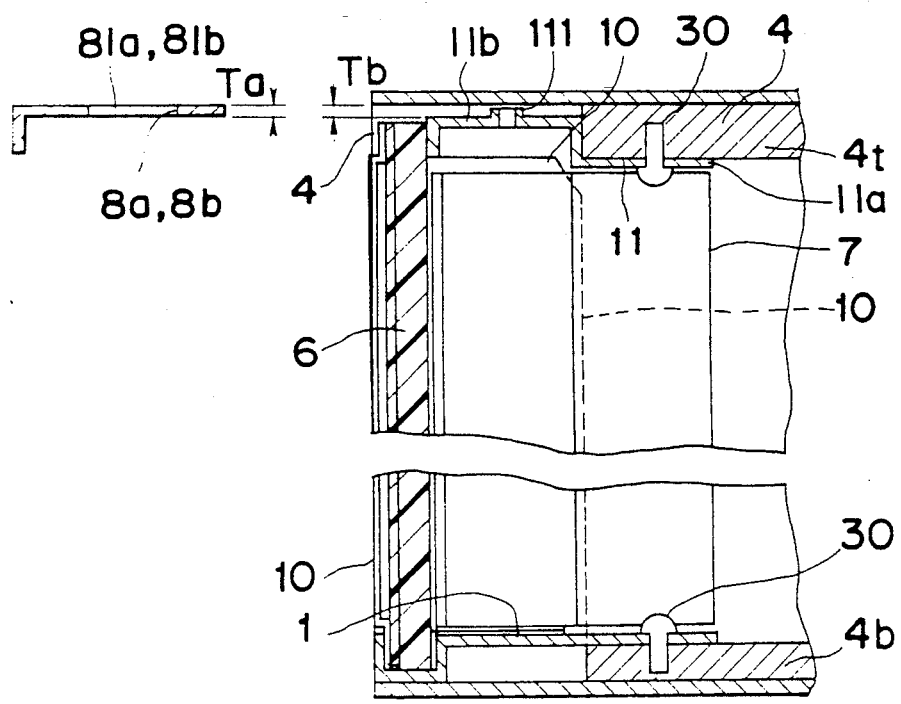

CASING FOR PROJECTION TELEVISION RECEIVER AND SCREEN MOUNTING METHOD

BACKGROUND OF THE INVENTION

1. Field of the Invention

The present invention relates to casing for a projection television receiver equipped with a transmission-type screen, and a method for mounting the screen thereon.

2. Description of the Prior Art

Transmission-type screens have become increasingly common on conventional projection television receivers. Other applications for transmission-type screens have also been found, including large-scale multiple display systems in which multiple projection television receivers are stacked vertically and horizontally in an rectangular configuration.

In FIG. 29, a conventional projection television receiver Tc with the transmission-type screen mounted in the cabinet is shown. The transmission-type screen 6 is fit into special recesses 295 provided in the front surface of cabinet body 4. The sashed strips 293 are applied to the front of the screen 6 to hold the edges thereof in place between the recess 295 and the strips 293. The strips 293 are secured to the cabinet body 4 with screws 294 so that the strips 293 can be removed to release the screen 6 from the cabinet 4 by loosing the screws 294 as may be necessary.

In FIG. 30, another conventional projection television receiver Tp is shown. The transmission-type screen 6 is placed between the cabinet 4 and the frame 303. The frame 302 is in a shape of rectangular tube having a rimmed portion at one side, and is freely fit in the cabinet 4 at the outside so as to hold the edge of the screen 6 by the rimmed portion.

However, with the television Tc, it is necessary to screw in and out many set screws 294 to install or remove the screen 6, thus increasing labor and time requirements.

Furthermore, in case that a plurality of the conventional projection televisions Tp are combined in a multiple display screen, it is extremely difficult to remove and replace the screen 6 to a single projection television receiver unit which is being laid under other units.

SUMMARY OF THE INVENTION

The object of the present invention is therefore to provide a casing for a projection television receiver.

The present invention has been developed with a view to substantially solving the above described disadvantages and has for its essential object to provide an improved casing.

In order to achieve the aforementioned objective, a casing for use in a projection television receiver having a transmission-type screen comprises a cabinet means for accommodating the screen therein. The cabinet means has a first side, a second side, a third side, and a fourth side for configuring the cabinet means in a rectangular tube opening at two sides, the first and second sides and the third and fourth sides being opposed to each other, respectively. The casing (CP) further comprises a first frame means having a first fix portion for being secured to the first side and a first free portion having a channel for catching the screen; a second frame means having a second fix portion for being secured to the second side and a second free portion for receiving the screen, the second free portion having a plurality of first projections for keeping the second free portion apart from the second side by a first predetermined distance to obtain a first slight gap therebetween; and a first insert means having a first insert portion being inserted to the first slight gap and a first hold portion for holding the screen between the second free portion and the first hold portion, the first insert portion being provided with a first notch for an engagement with the first projection when the first insert portion is inserted to the first slight gap.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which:

FIG. 3 is a fragmentary cross-sectional view taken along a line 1—1B' shown in FIG. 1;

FIG. 4 is a fragmentary perspective view of a projection television receiver shown in FIG. 1 in which the screen is completely installed thereto;

FIG. 9b is an enlarged side view of the screen top holding bracket viewed in the arrow direction shown in FIG. 9a;

FIG. 11b is an enlarged side view of the screen side holding bracket viewed in the arrow direction shown in FIG. 11a;

FIG. 15 is a fragmentary exploded view in perspective of a projection television receiver according to an alternation of the first embodiment of the present invention;

FIG. 16 is a cross-sectional view taken along a line 3A—3A' shown in FIG. 15;

DETAILED DESCRIPTION OF THE PREFERRED EMBODIMENT

Referring to FIGS. 1 to 14, a projection television casing CP according to a first preferred embodiment of the present invention is described herebelow.

Figure 1:
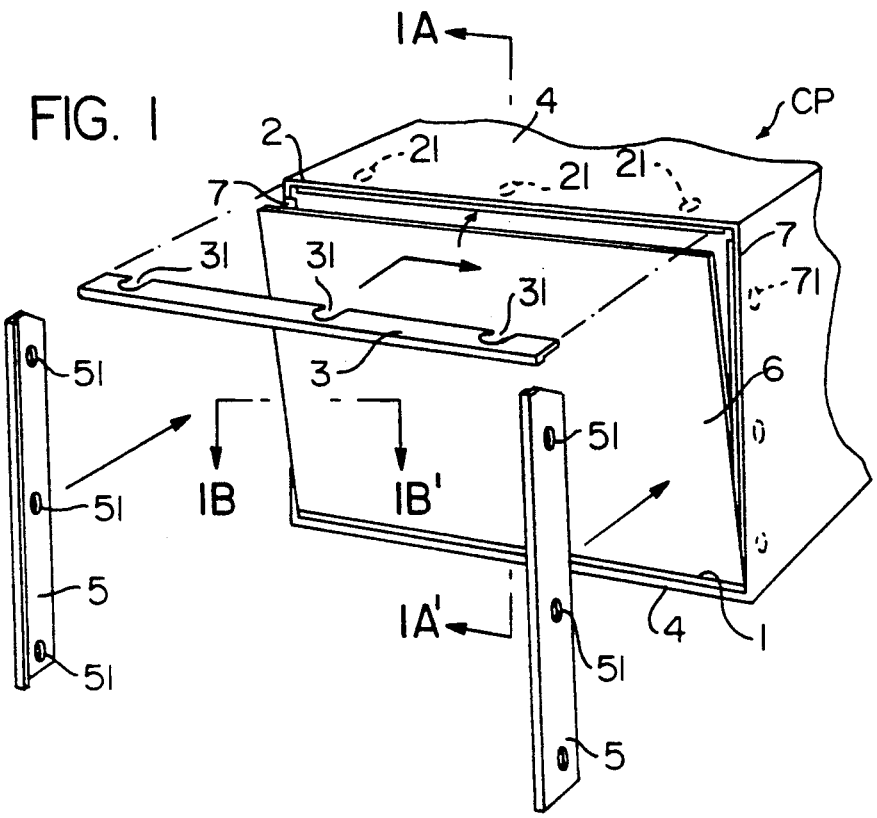
FIG. 1 is a fragmentary exploded view in perspective of a projection television receiver according to a first embodiment of the present invention.
Figure 2:
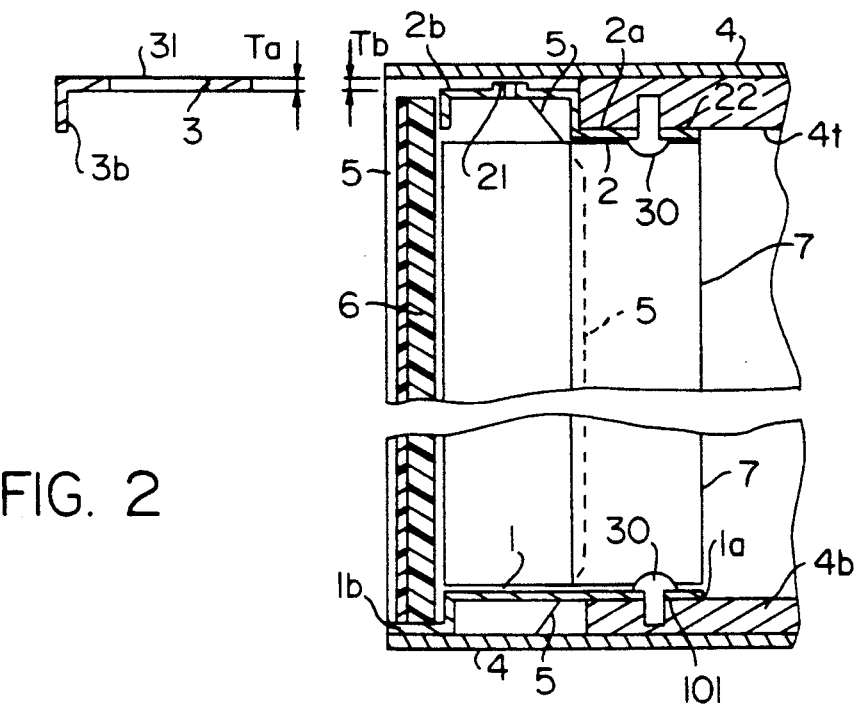
FIG. 2 is a cross-sectional view taken along a line 1A—1A' shown in FIG. 1.
Figure 5:
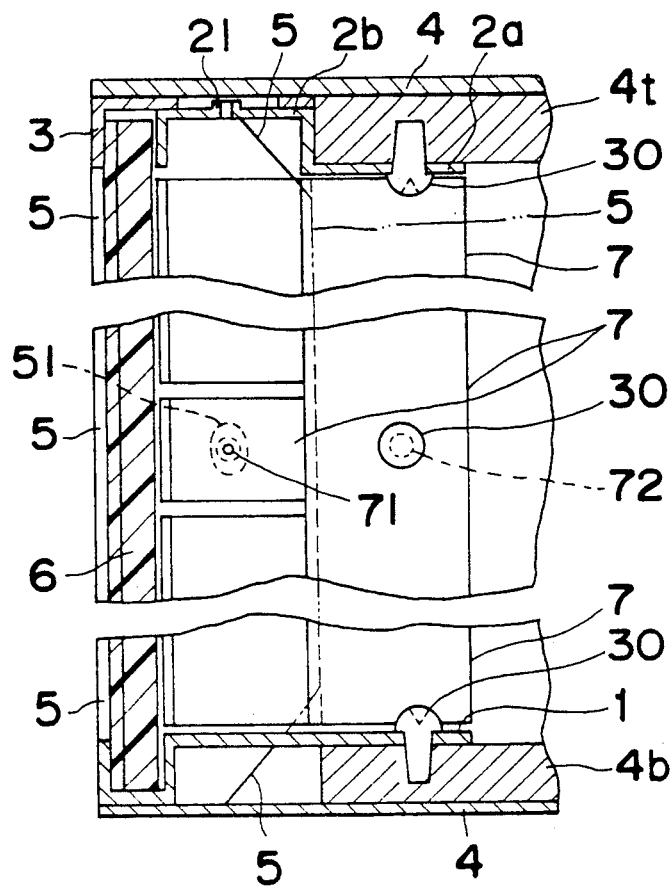
FIG. 5 is a cross-sectional view taken along a line 2A—2A' shown in FIG. 4.
Figure 10:
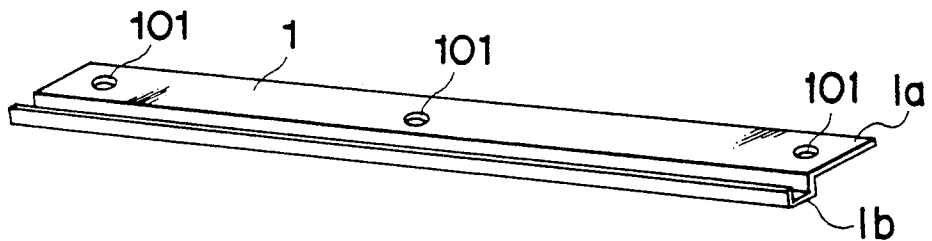
FIG. 10 is an enlarged perspective view of the screen bottom holding bracket shown in FIG. 1.

As best shown in FIG. 10, a bottom screen holding bracket 1, formed by a plate, includes a flat portion 1a elongating in a direction and a second convex portion 1b formed in a generally C shape which extends at one of the elongated edges of the flat portion 1a. A plurality of screw holes 101 for the set screws 30 are provided in the flat portion 1a a predetermined pitch. As shown in FIG. 2, the bottom screen holding bracket 1 is installed by the set screws 30 through holes 101 to an bottom mount 4b which is provided on the front bottom of a television cabinet body 4 keeping the convex side of portion 1b down.

Figure 9A:
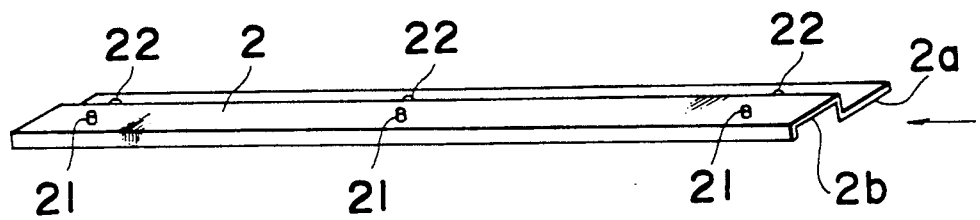
FIG. 9a is an enlarged perspective view of the screen top holding bracket shown in FIG. 1.
Figure 9B:
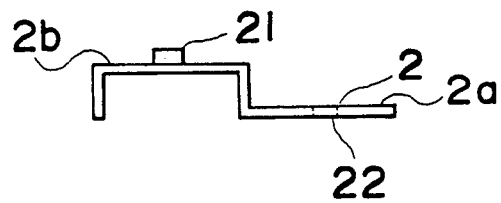

As best shown in FIGS. 9a and 9b, a top screen holding bracket 2 is formed by a plate similarly to the bottom screen holding bracket 1 to have a flat portion 2a including a plurality of screw holes 22 and a convex portion 22 having a plurality of projection 21. As shown in FIG. 2, the top screen holding bracket 2 is installed by the set screws 30 through holes 22 to a top mount 4t provided on the front inside top of the cabinet body 4 keeping the convex side of portion 2b up so as to keep a slight Gab Tb between the cabinet 4 and the convex portion 2b.

Figure 11A:
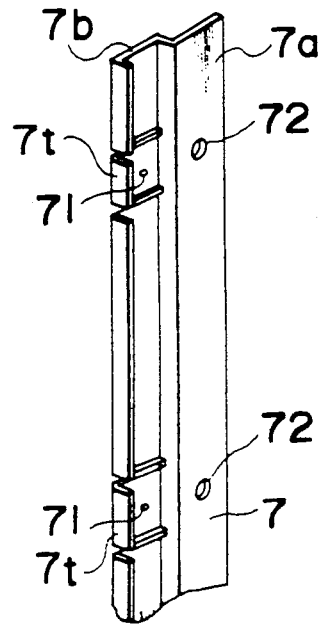
FIG. 11a is an enlarged perspective view of the screen side holding bracket shown in FIG. 1.
Figure 11B:
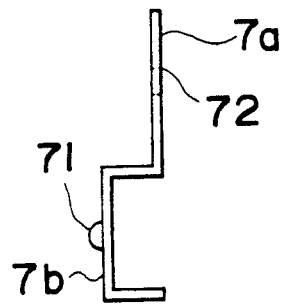

As best shown in FIG. 11, a side screen holding bracket 7, formed by a plate similarly to the top screen holding bracket 2, includes a flat portion 7a provided with a plurality of screw holes 72 and a convex portion 7b which is partially cut in a direction perpendicular to the longitudinal direction of thereof into a plural portions to obtain small tab 7t in which a projection 71 is provided. As shown in FIG 7, the side screen holding bracket 7 is installed by set screws 30 through holes 72 to each of left and light side mounts 4l and 4r (not shown) provided on each of the right and left sides of the cabinet body 4, respectively, keeping the convex side surface of the convex portion 7b to face the cabinet wall. As a result of the installation, a slight gap Tc between the cabinet 4 and the convex portion 7t is produced.

A screen 6 is then set in the bottom screen holding bracket 1 and swung into place in the cabinet body 4 front.

Figure 7A:
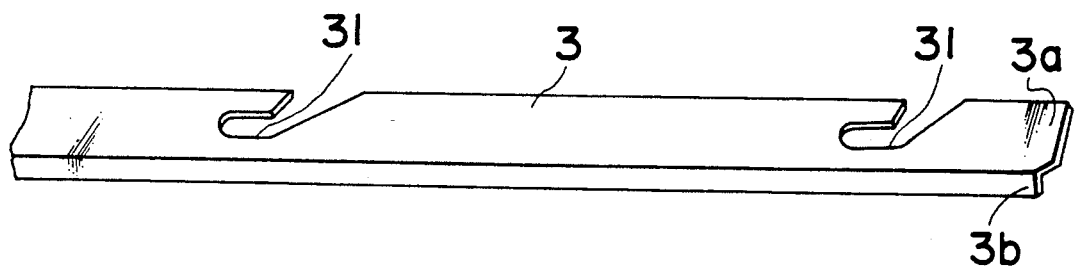
FIG. 7a is a fragmentary enlarged view of the screen top clamping frame shown in FIG. 1.
Figure 7B:
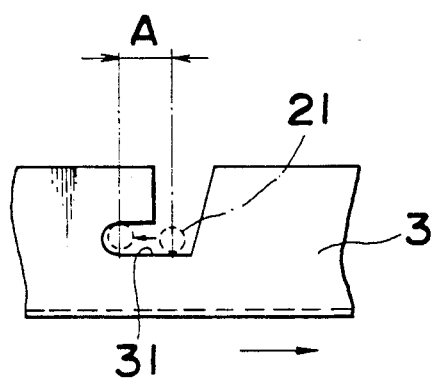
FIG. 7b is a plan view showing the notched portion of the screen top clamping frame shown in FIG. 1.

As best shown in FIGS. 7a and 7b, a screen clamping frame 3, formed by a plate having a predetermined thickness of Ta, includes a flat portion 3a having its one end portion bent at an predetermined angle to provided an upright portion 3b which extends along with the longitudinal direction of the flat portion 3a. A plurality of notches 31 in a generally L-shaped shape are provided on the flat portion 3a a predetermined distance to extend in a first direction perpendicular to and a second directions parallel to the longitudinal direction of the screen clamping frame 3. In this embodiment, the notch 31 is in a reversed L shape such that the closed end portion of the notch 31 locates in the left side with respect to the second direction. The notch 31 is so configured as to receive and catch the projection 21 at the closed end of L-shaped notch thereof by being biased to the right direction with respect to the projection 21. As shown in FIG. 2, the screen clamping frame 3 is then inserted to the slight gap Tb in the direction of the arrow, and is then slid sideways such that each of L-shaped notches 31 engages with each of projections 21.

Figure 6:
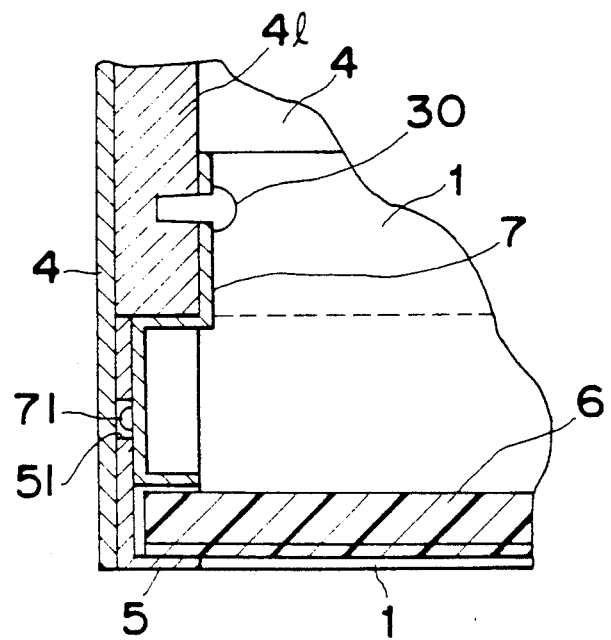
FIG. 6 is a fragmentary cross-sectional view taken along a line 2B—2B' shown in FIG. 4.
Figure 8:
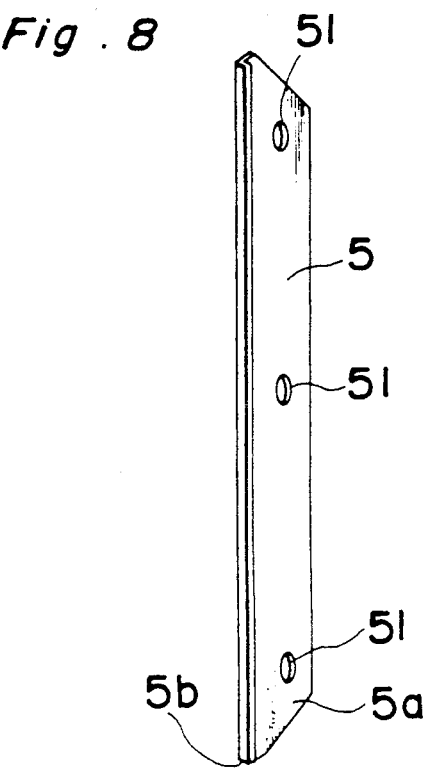
FIG. 8 is an enlarged perspective view of the chassis retainer shown in FIG. 1.

As best shown in FIG. 8, a screen side clamping frame 5, formed by a plate having a predetermined thickness Td similarly to the screen clamping frame 3, includes a flat portion 5a and an upright portion 5b extending perpendicular to the flat portion 5a by a predetermined length TA. A plurality of oval holes 51 having a diameter greater than that of the projection 71 are provided in the flat portion 5a a predetermined pitch. As shown in FIG. 3, the flat portion 5a of the screen side clamping frame 5 is inserted to the gap Tc. During the insertion, the screen side clamping frame contacts with and forces the projection 71 on the tab portion 7t to move inside the cabinet 4. Since the tab portion 7t, is partially cut away from the other portion of the convex potion 7b, resiliently deforms inside from the original position due to the spring action, the screen side clamping frame 5 can be continuously inserted beyond the projection 71. When the oval hole 51 reaches the projection 71, the tab portion 7t returns to the original position and so that the projection 71 is seized by the oval hole 51 and engaged, as shown in FIG. 6.

In FIG. 4, a perspective view of the television casing CP completely installed in a manner as described in the above is shown.

Figure 12A:
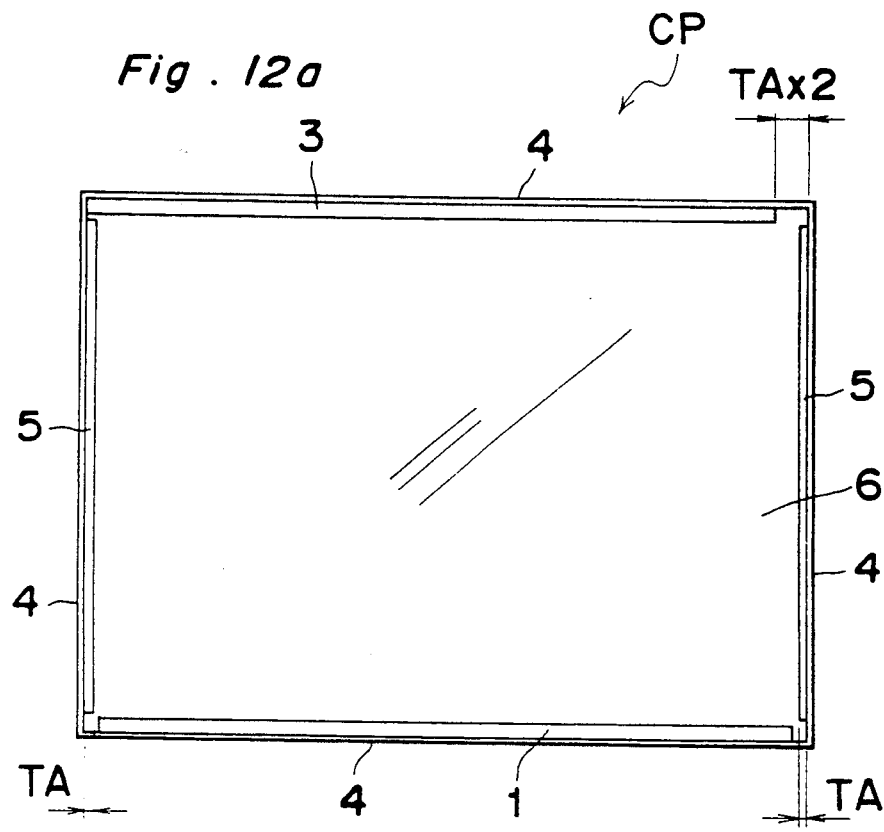
FIGS. 12a and 12b front views showing the installation procedure of the screen top clamping frame in the projection television receiver according to the first embodiment of the present invention.
Figure 12B:
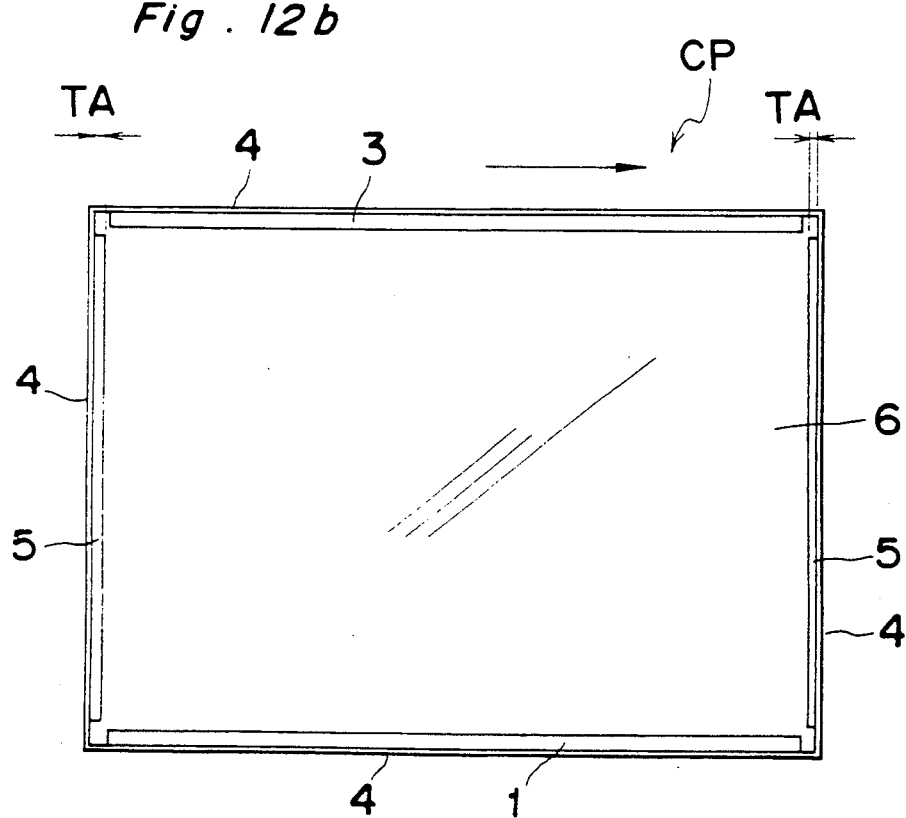

Referring to FIGS. 12a and 12b, the installation procedure of the screen top clamping frame 3 in the projection television receiver casing CP is described. The screen top clamping frame 3 is formed to elongate by a length equal to the inside width of the cabinet body minus at least twice the width, the predetermined length TA of the upright portion 5b, of the screen side clamping frames 5.

The screen clamping frame 3 is inserted to the slight gap Tb such that the screen clamping frame 3 locates in the left side position proximal to the left side wall of the cabinet 4 to keep a distance equal to or greater than twice the predetermined length TA far from the right side wall of the cabinet. As the screen top clamping frame 3 is inserted, the L-shape notches 31 provided on the frame 3 is slid to the right and fit around the projections 21, such that the sliding distance of the screen top clamping frame 3a is equal to or greater than the width TA of the screen side clamping frames 5. Thus, the screen top clamping frame 3a firmly engages with the top screen holding bracket 2 and installs the screen 6 in the cabinet 4, as shown in FIG. 12b.

Figure 13:
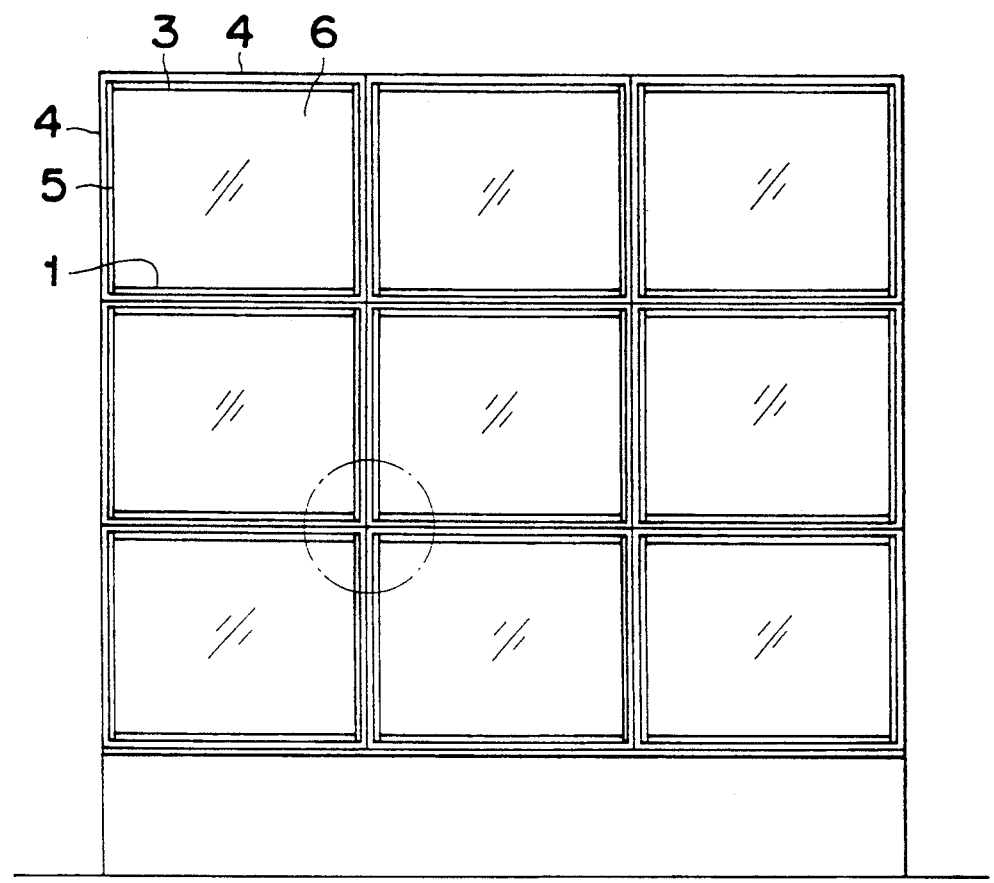
FIG. 13 is a front view of the large-scale multiple screen system combining a plurality of projection television receivers according to the present invention.
Figure 14:
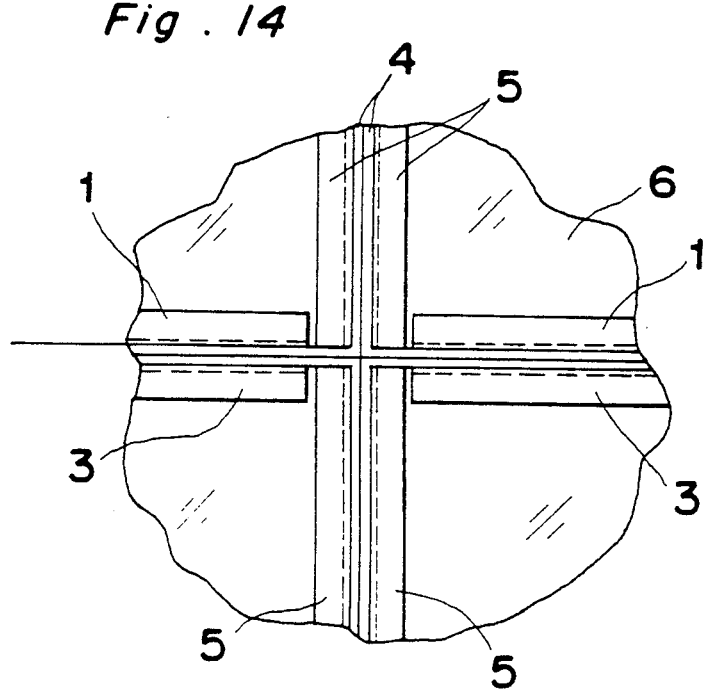
FIG. 14 is a fragmentary view showing, on an large scale, a portion of FIG 13 which is enclosed by the circle.
Figure 17:
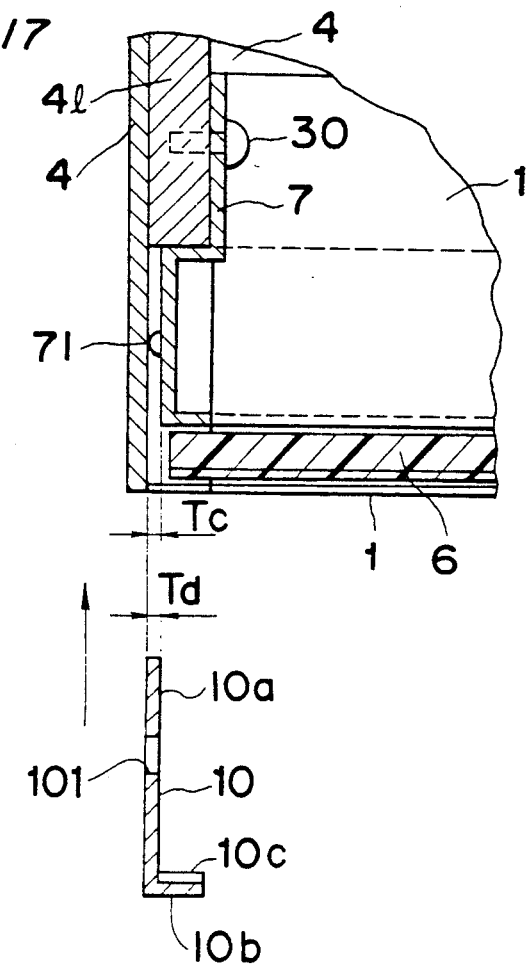
FIG. 17 is a fragmentary cross-sectional view taken along a line 3B—3B' shown in FIG. 15.
Figure 18:
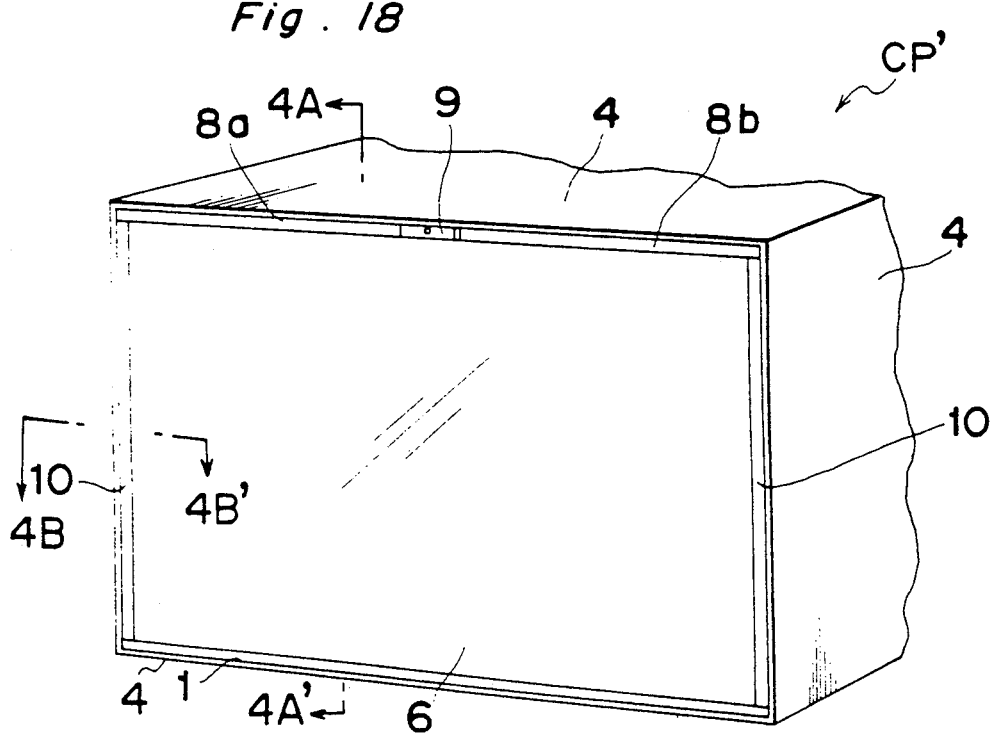
FIG. 18 is a fragmentary perspective view of a projection television receiver shown in FIG. 16 in which the screen is completely installed thereto.

Since the screen 6 can be easily replaced only by engaging or disengaging the screen top clamping frame 3a with the top screen holding bracket 2 as described above, it is very effective to apply the present invention to a large-scale multiple screen system which combines plural projection television receivers shown in FIG. 2 in a construction, as shown in FIGS. 13 and 14, making it possible to remove or replace the screen without disassembling any of the multiple screen system.

An alternation of the first embodiment of the present invention is described below with reference to FIGS. 15 to 25.

Figure 21:
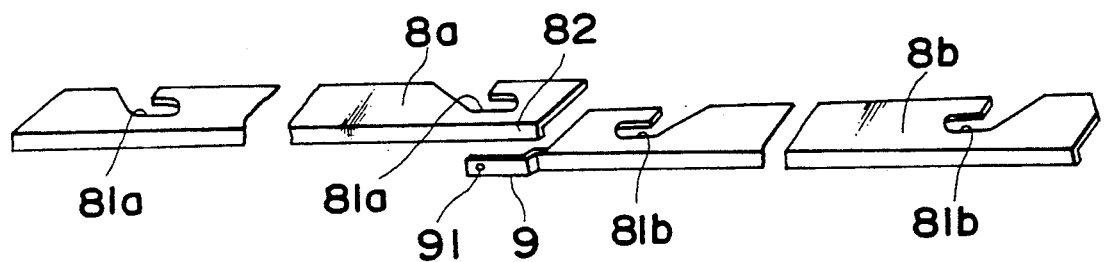
FIG. 21 is an enlarged view of the right and left half frames shown in FIG. 20.
Figure 22:
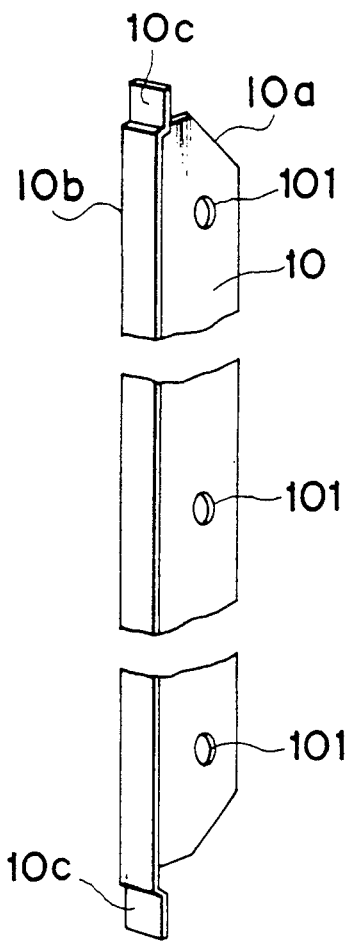
FIG. 22 is an enlarged perspective view of the screen side holding bracket shown in FIG. 20.

As best shown in FIG. 21, the screen top clamping frame 3 in the first embodiment is replaced by a left half frame 8a and a right half frame 8b which are formed similarly to the top screen clamping frame 3 in this alternation. The right half frame 8b is provided with a plurality of right notches 81b formed in the same shape as that of the L-shaped notches 31. The left frame 8a is also provided with a plurality of left notches 81a which is formed in the symmetrical shape to that of the right notches 81b as shown. The left half frame 8a is also provided with a projection 82 at the right side on the upright portion.

The right half frame 8b further includes a tab 9 which protrudes from the left side of the upright portion thereof. The tab 9 is bent twice in generally a L-shape such that the tab 9 can overlap the front side of the left half frame 8a when both of left and right half frames 8a and 8b are inserted into the slight gap Tb. The tab 9 is also provided with a through hole 91 which extends between the front and back sides thereof (at least opened at the backside hereof) and has a diameter enough large to receive and catch the projection 82.

Since the right and left half frames 8b and 8a, each having a length approximately equal to a half of the inside cabinet body, are shifted in opposite directions away from each other for installation, there will be a small gap WB between the right and left half frames 8b and 8a when the frames 8b and 8a are installed to the television casing CP. In consideration of the gab WB, the tab 9 having a length longer than the gab WB is formed so that the projection 82 and the hole 91 make an engagement when the right and left half frames 8b and 8a are installed to the cabinet, as shown in FIGS. 23a, 23b, and 23c.

Figure 19:
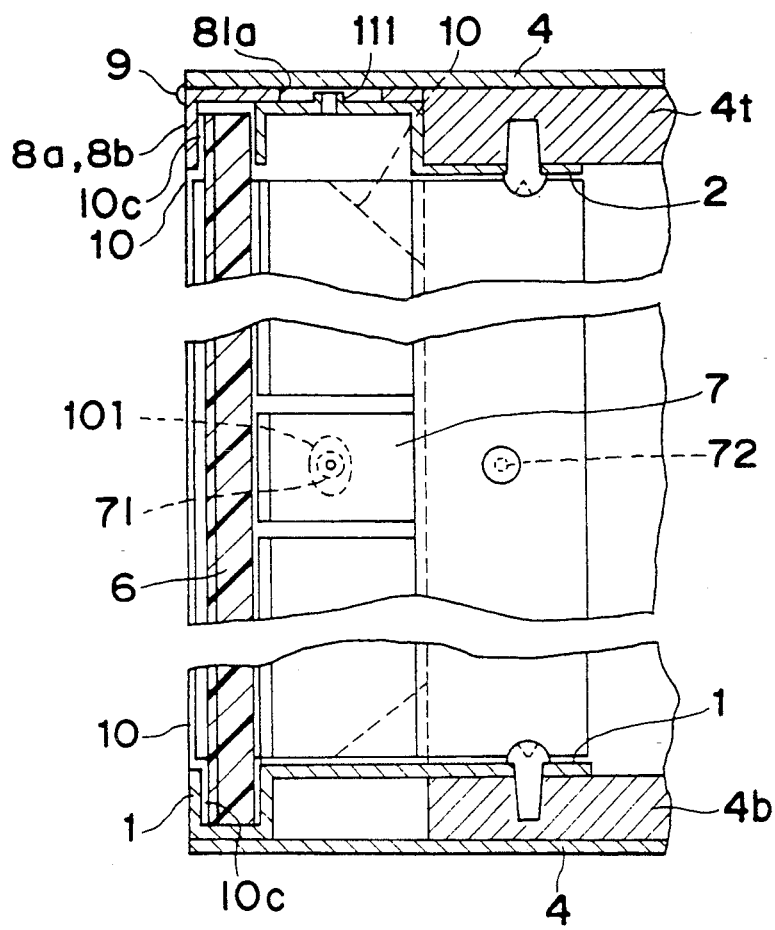
FIG. 19 is a cross-sectional view taken along a line 4A—4A' shown in FIG. 18.
Figure 20:
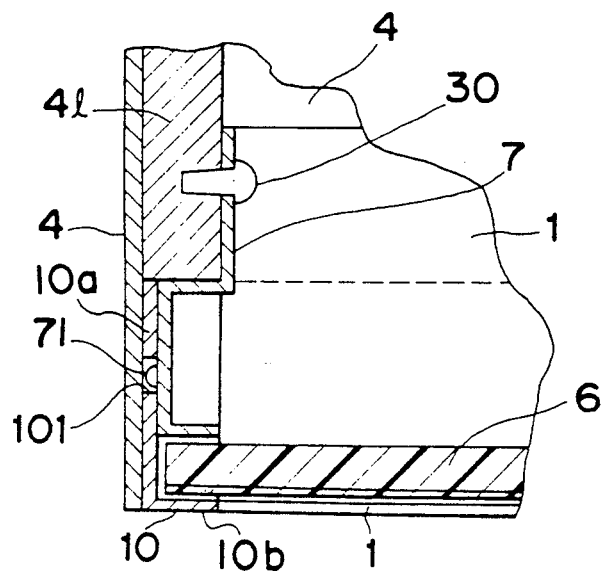
FIG. 20 is a fragmentary cross-sectional view taken along a line 4B—4B' shown in FIG. 18.
Figure 23A:
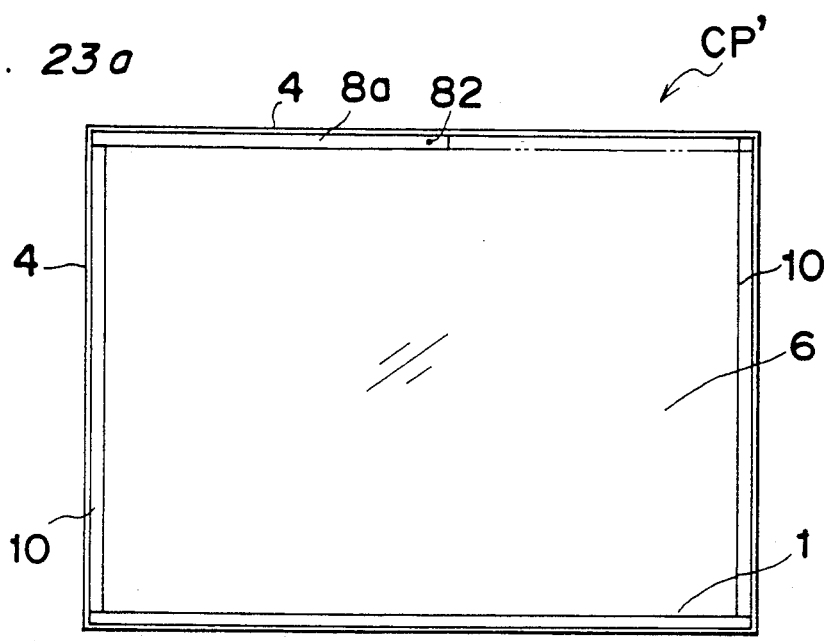
FIG. 23a and 23b are front views showing the installation procedure of the right and left half frames in a projection television receiver shown in FIG. 18.

First, as shown in FIG. 23a, the left half frame 8a is inserted in the left half portion of the slight gab Tb formed between top wall of the cabinet and an alternative top screen holding bracket 11. The alternative top screen holding bracket 11 is formed in the very similar construction as the top screen holding bracket 3 but is provided projection 111 according to the right and left notches 81b and 81a, as best shown in FIG. 19. By the insertion, the left notch 81a and the projection 111 makes an engagement.

Figure 23B:
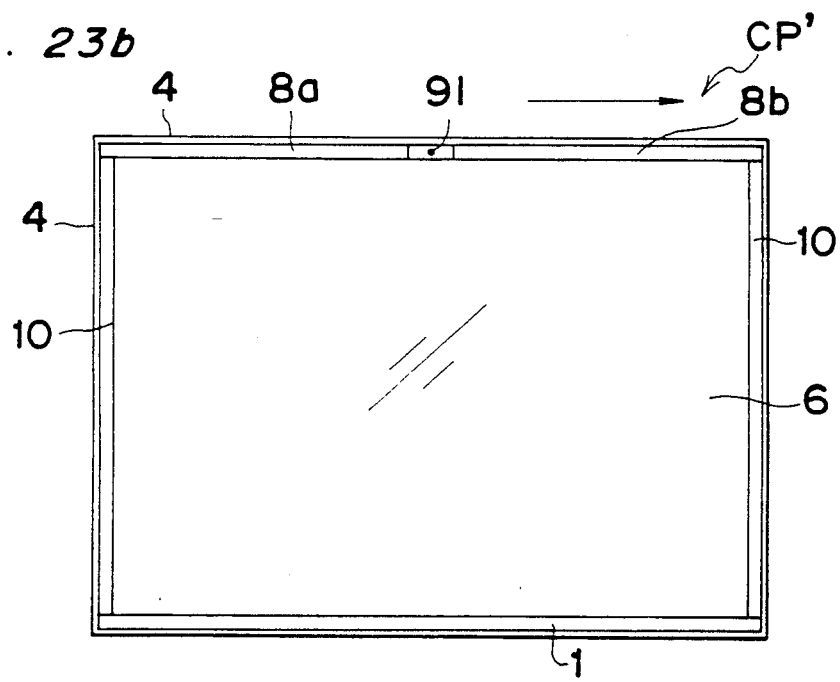
Figure 23C:
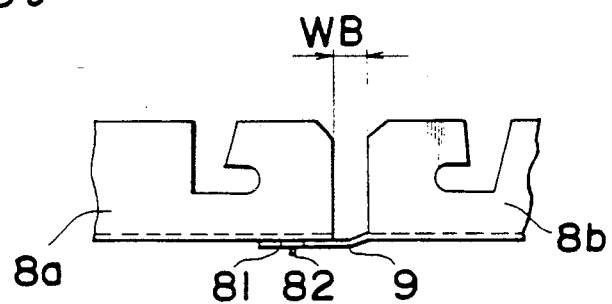
FIG. 23c is a enlarged plane view showing the engaged portion of the right and left half frames shown in FIG. 18.

Next, the right half frame 8b is inserted in the right half potion of the slight gab Tb such that the right notches 81b and the projection 111 make an engagement, as shown in FIG. 23b. During this engagement, the right half frame 8b moves right and the hole 81 of the tab 9 catches the projection 82, as shown in FIG. 23c. Since the tab 9 is formed to absorb the gab WB as described above, the right and left ends of the half frames 8a and 8b also overlap the tabs 10c of the screen side clamp 10 to positively hold the screen 6, as best shown in FIG. 19.

Figure 24:
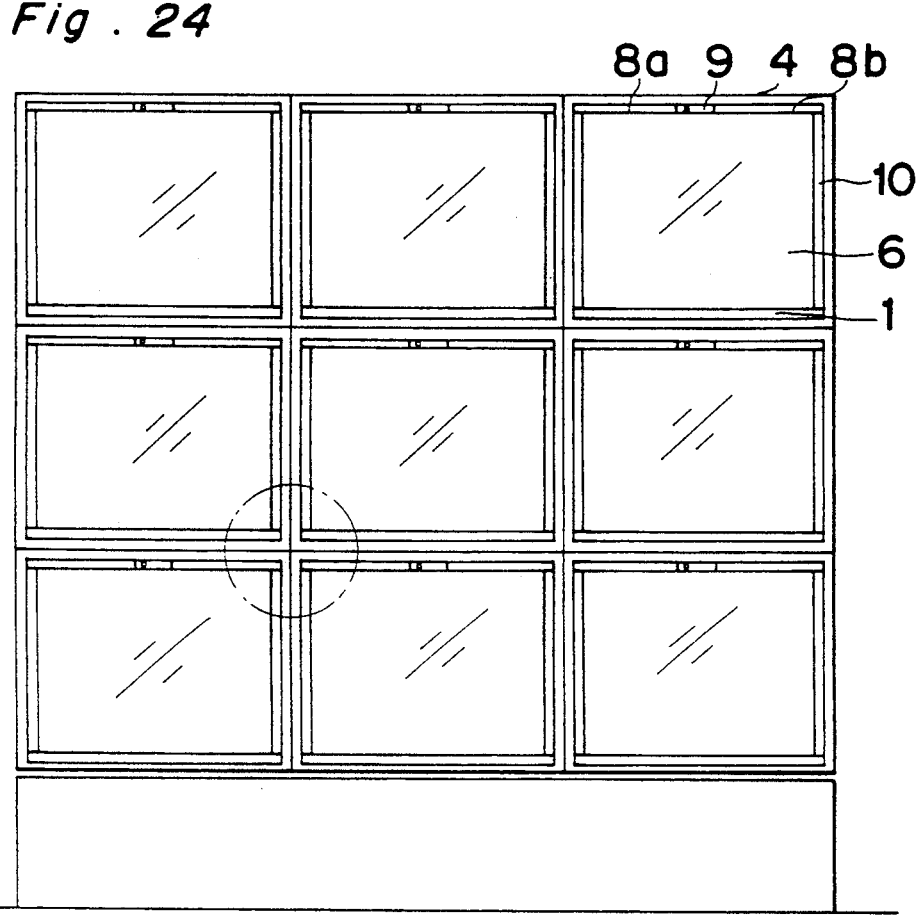
FIG. 24 is a front view of the large-scale multiple screen system combining a plurality of projection television receivers shown in FIG. 18.
Figure 25:
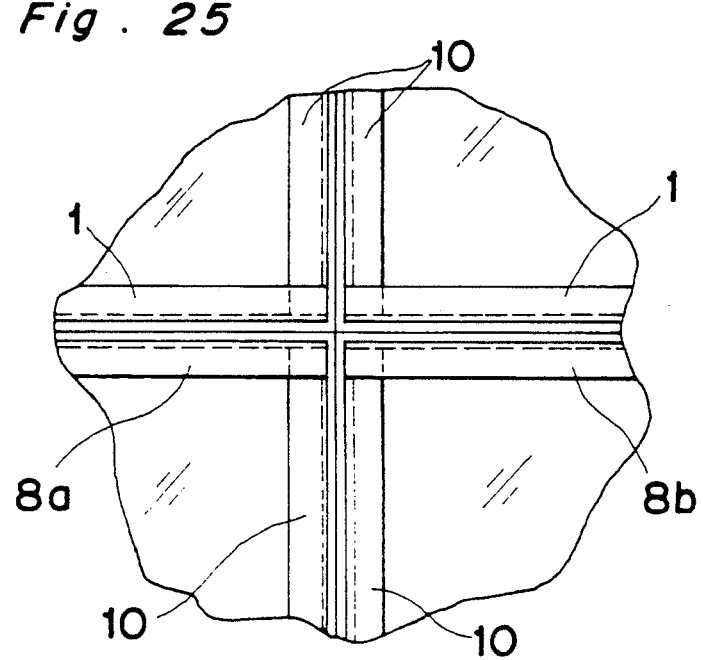
FIG. 25 is a fragmentary view showing, on an large scale, a portion of FIG. 24 which is enclosed by the circle.

Referring to FIGS. 24 and 25, another example of a large-scale multiple screen system which combines plural projection receivers according to the alternation of the first embodiment of the present invention is shown. As same as the first embodiment, the screen 6 can be easily replaced only by engaging or disengaging the right and left half frames 8b and 8a with the top screen holding bracket 11.

Referring to FIGS. 26, 27a, 27b, 27c, 27d, and 28, a television casing PC" according to a second embodiment of the present invention is described. The television casing PC" comprises a cabinet 261, a screen 262, a top and a bottom frames 263a and 263b, two side frames 263a, a plurality of top and bottom springs 264a, and a plurality of side springs 264b, as shown. The television casing PC" is installed in the following procedures.

Figure 26:
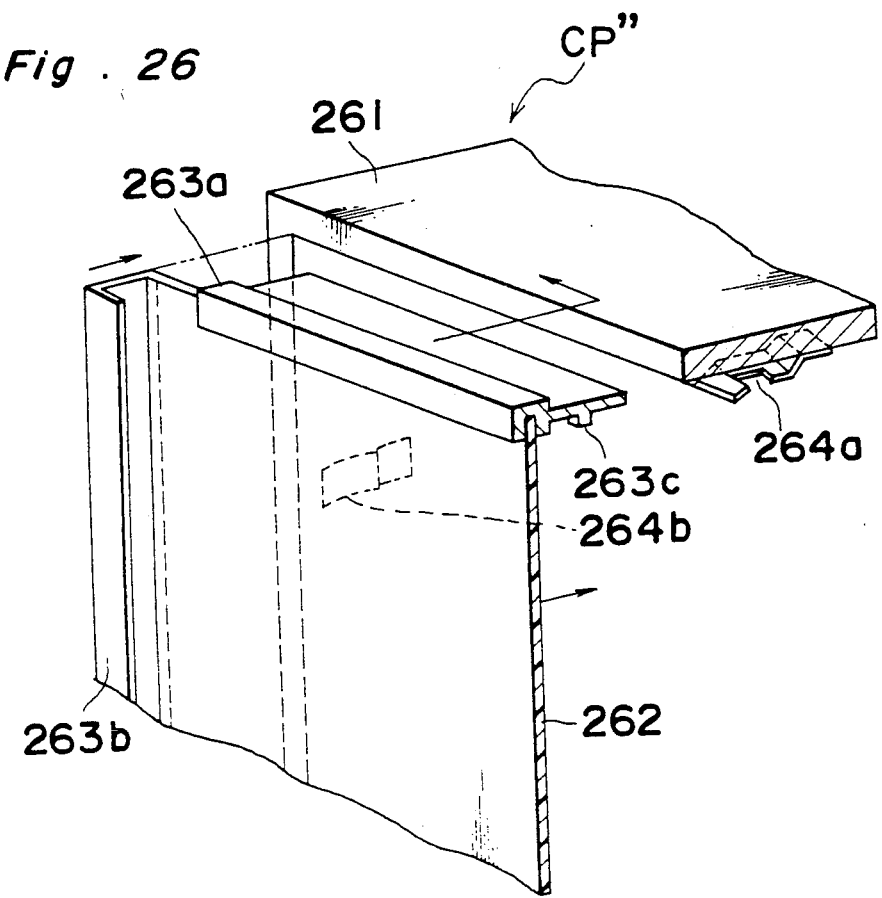
FIG. 26 is a fragmentary exploded view in perspective of a projection television receiver according to a second embodiment of the present invention.
Figure 28:
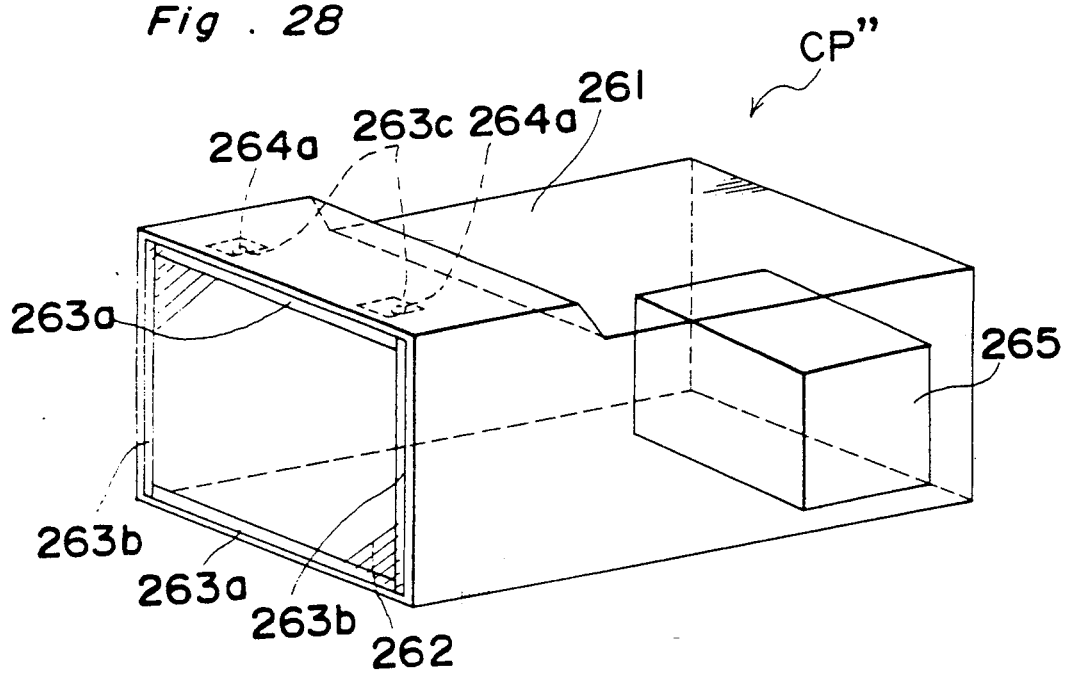
FIG. 28 is a perspective view of the projection television receiver shown in FIG. 26 in which the screen is completely installed thereto.

The top and bottom ends of the screen 262 are fit into the U-shaped channels provided in each of the top and bottom frames 263a at the top and bottom, as shown in FIG. 26.

Figure 27A:
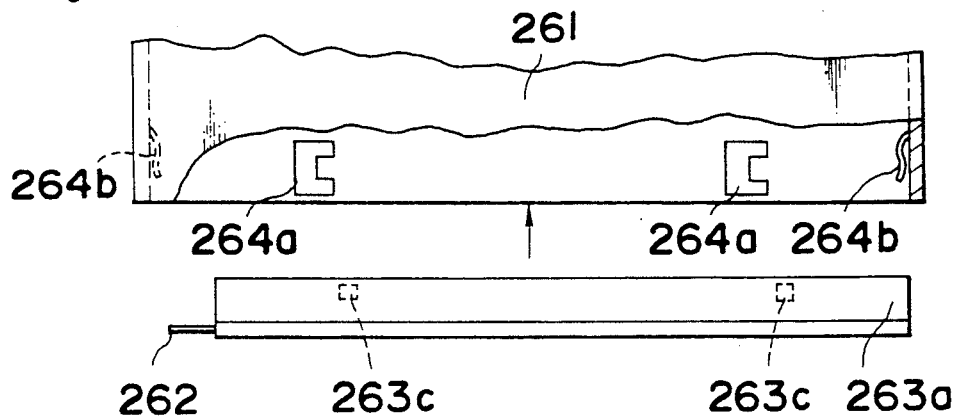
FIGS. 27a to 27d are fragmentary cross-sectional views showing the installation procedure of the screen in a projection television shown in FIG. 26.
Figure 27B:
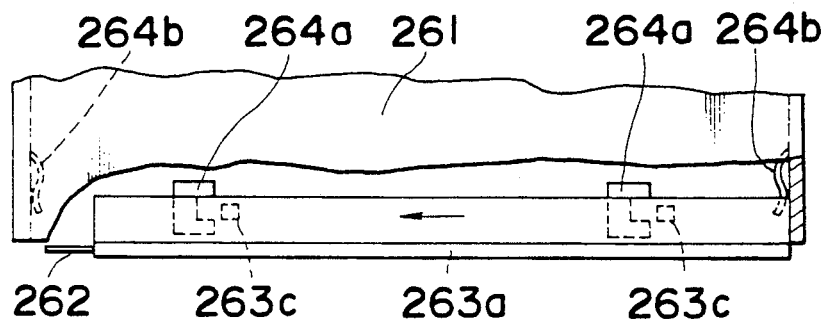

One end of each frame 263a is inserted to the gap between the cabinet 261 and the top and bottom springs 264a provided as part of the cabinet 261, and the frames 263a are then slid to the left, as shown in FIG. 27a and 27b.

Figure 27C:
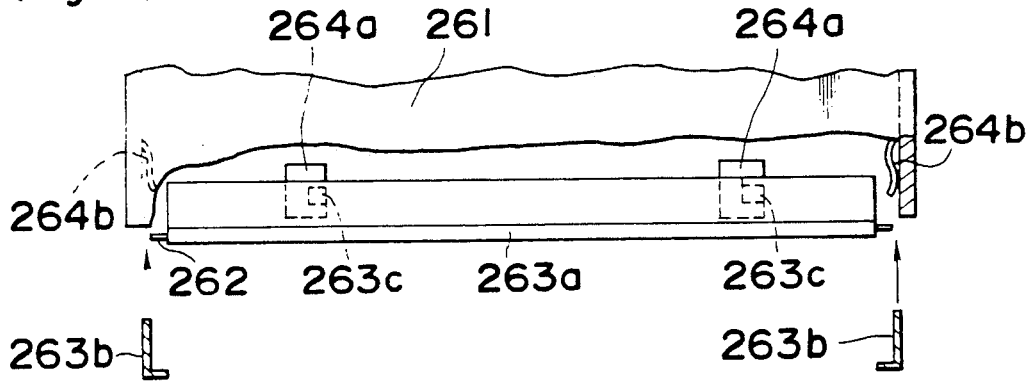

Two projections 263c provided on the lower surface of the frames 263a thus fit into the springs 264a, as shown in FIG. 27c.

Figure 27D:
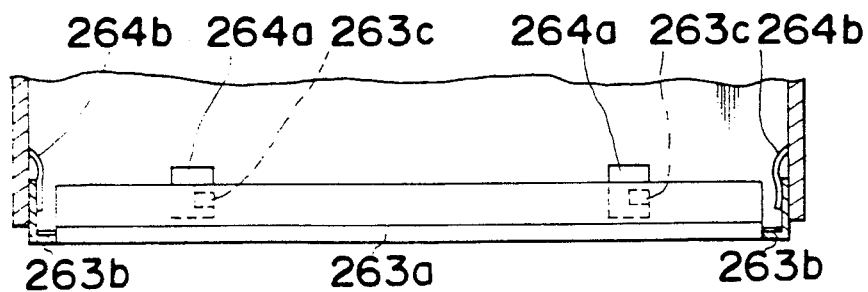
Figure 29:
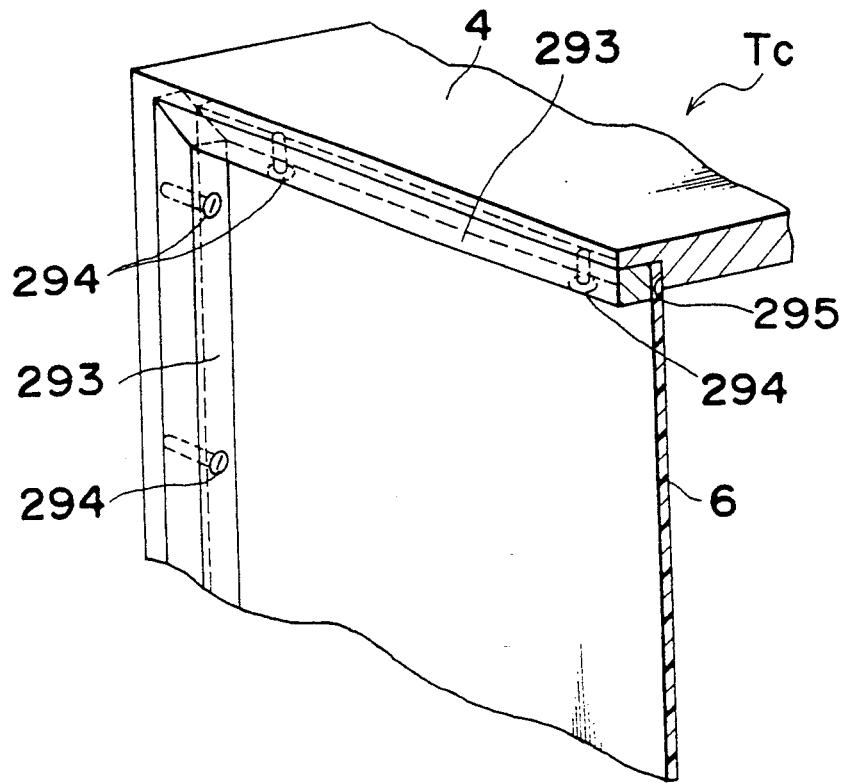
FIG. 29 is a fragmentary perspective view of a conventional projection television receiver.
Figure 30:
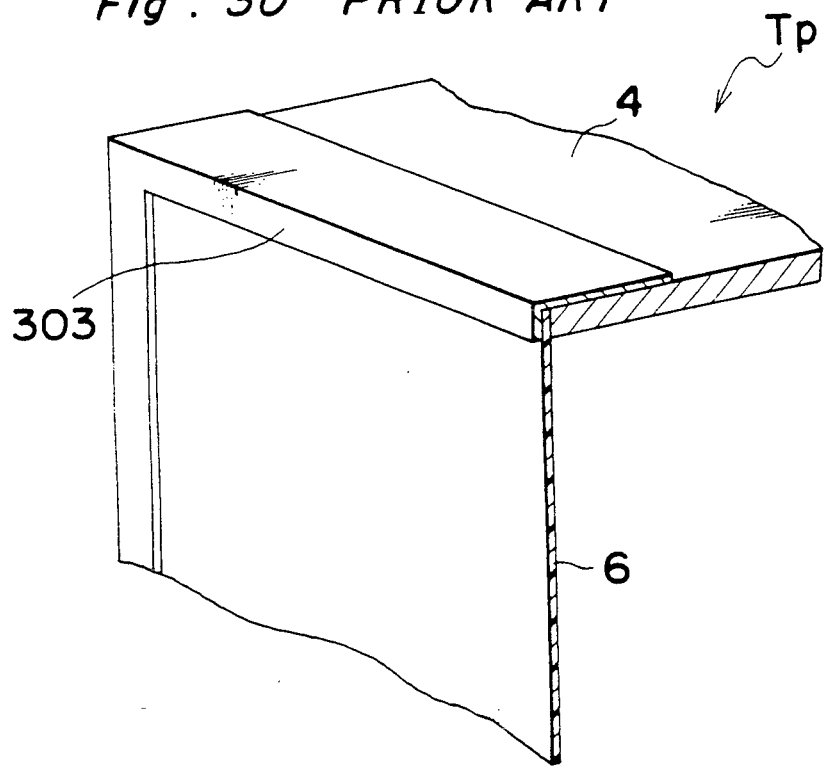
FIG. 30 is a fragmentary perspective view of an alternative conventional projection television receiver.

The frame 263a is thus held vertically by the tension of the springs 264a, and laterally by the mating of the projections 263c with the notches in the side springs 264a. Next, one end of each side frame 263b is inserted to the gap between the cabinet 261 and the side springs 264b provided as part of the cabinet 261, as shown in FIG. 27d.

The screen 262 and the frames 263a are thus prevented from moving sideways, and are thus prevented from slipping accidentally out of the cabinet 261. The frames 263a and 263b, and the screen 262 can thus be installed in the cabinet 261. A projectore unit 265 provided in the cabinet projects the image to thus install screen 262. In addition, the screen 262 can also be removed from the cabinet 261.

As described hereinabove, the screen can be easily removed from a projection television receiver either singly or when used in a multiple display screen system, and a projection television receiver with a thin border around the screen area can be provided for use in a multiple display screen system.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A casing for use in a projection television receiver having a transmission-type screen comprising:
    a cabinet means for accommodating said screen therein, said cabinet means having a first side, a second side, a third side and a fourth side for configuring said cabinet means to have a rectangular opening, said first and second sides and said third and fourth sides being opposed to each other, respectively;
    a first frame means having a first fix portion for being secured to said first side and a first free portion having a channel for catching said screen;
    a second frame means having a second fix portion for being secured to said second side and a second free portion for receiving said screen, said second free portion having a plurality of first projections for keeping said second free portion apart from said second side by a first predetermined distance to obtain a first slight gap therebetween; and
    a first insert means having a first insert portion being inserted to said first slight gap and a first hold portion for holding said screen between said second free portion and said first hold portion, said first insert portion being provided with a first notch for an engagement with said first projection when said first insert portion is inserted to said first slight gap.

2. A casing as claimed in claim 1, further comprising:
    a third frame means having a third fix portion for being secured to said third and fourth sides and a third free portion for receiving said screen, said third free portion having a second projection for keeping said third free portion apart from said third and fourth sides by a predetermined distance to obtain a second slight gap therebetween; and
    a second insert means having a second insert portion being inserted to said second slight gap and a second hold portion for holding said screen between said third free portion and said second hold portion, said second insert portion being provided with a second notch for an engagement with second projection when said second insert portion is inserted to said second slight gap.

3. A casing as claimed in claim 1, wherein said first notch having a first notch portion opening at an edge opposed to said first hold portion and second notch portion extends to close in a direction approximately parallel to said edge such that said first and second notch portions integrally configure an L-shape, whereby said first projection moves in a first direction approximately perpendicular to said edge along with said first notch and then slides to engage in a second direction approximately perpendicular to said first direction when said first insert means is inserted.

4. A casing as claimed in claim 3, wherein said first insert means comprises:
    a first half insert means having a first half insert portion being inserted to said first slight gap and a first half hold portion for holding said screen between said second free portion, said first half insert portion being provided with a first half notch for an engagement with said first projection; and
    a second half insert means having a second half insert portion being inserted to said first slight gap and a second half hold portion for holding said screen between said second free portion, said second half insert portion being provided with a second half notch for an engagement with said first projection, said first and second half notches being symmetrical to each other, whereby said first and second half insert means are installed to said second frame means in positions proximal to said third and fourth sides, respectively, so that said first and second half insert means slides in opposite directions and overlaps each of top ends of said second insert means.

5. A casing as claimed in claim 2, wherein said third free portion is partially cut from the front end edge thereof toward said third fix portion and divided into a plurality of small parts so that said second projection provided thereon can be resiliently moved away from the ordinal position by said second insert portion and returns to the original position to engage with said second notch while said second insert means is inserted to said second gap.

6. A casing for use in a projection television receiver having a transmission-type screen comprising:
    a cabinet means for accommodating said screen therein, said cabinet means having a first side, a second side, a third side, and a fourth side for configuring said cabinet means to have a rectangular opening, said first and second sides and said third and fourth sides being opposed to each other, respectively;
    a plurality of first spring fixtures for being secured and biased to said first and second sides for keeping a first clearance from said first and second sides, said first spring fixtures having a first side notch opened on one of sides thereof;
    a plurality of second spring fixtures for being secured and biased to said third and fourth sides for keeping a second clearance from said third and fourth sides;
    two of a first frame having a channel portion for catching said screen therein and a first flat portion for being inserted to said first clearance, said channel portion being raised from the top surface of said flat portion for functioning as a stopper at which said first frame stops when inserted to said first clearance, said first flat portion having a plurality of projections on the bottom surface thereof; and
    two of a second frame having a hold portion for holding said screen and a second flat portion for being inserted to said second clearance, whereby said screen is installed to said cabinet means such that said first frames catching said screen in said channel portion is seized at said first clearance having said projection engaged with said first side notch and said second frames holding said screen by said hold portion is seized by said second spring fixtures at said second clearance.

7. A method for mounting a screen to a projection television receiver casing comprising a cabinet means having a first side, a second side, a third side, and a fourth side for configuring said cabinet means to have a rectangular opening, a first frame means having a first fix portion and a first free portion having a channel; a second frame means having a second fix portion and a second free portion having a plurality of first projections; and a first insert means having a first hold portion and a first insert portion provided with a first notch for an engagement with said first projection, said method comprising the steps of:

secureing said first fix portion to said first side with said channel facing up;

securing said second fix portion to said second side with said first projections upward to keep said free portion apart from said second side by a predetermined distance for obtaining a first gap therebetween;

inserting said screen in said channel; and inserting said first insert means to said first gap such that said first notch engages with said first projection and said hold portion holds said screen between said first free portion and said first hold portion.

8. A method for mounting a screen to a projection television receiver casing comprising a cabinet means having a first side, a second side, a third side, and a fourth side for configuring said cabinet means in a rectangular tube opening at two sides, a third frame means having a third fix portion and a third free portion having a second projection; and a second insert means having a second insert portion provided with a second notch and a second hold portion for holding said screen, said method comprising the steps of:

securing said third fix portion to said third and fourth sides as said second projections faces to said third and fourth sides to keep said third free portion apart from said third and fourth sides by a predetermined distance for obtaining a second gap therebetween;

inserting said screen in said cabinet means so as to contact with said third free portions; and inserting said second insert means to said second gap such that said second notch engages with said second projection and said second hold portion holds said screen between said third free portion and said second hold portion.

* * * * *